United States Patent
Fan et al.

(10) Patent No.: US 9,300,417 B2
(45) Date of Patent: Mar. 29, 2016

(54) METHODS AND APPARATUS FOR PROVIDING USER-SELECTABLE PRESET OPTIONS AND ASSOCIATED DATA FOR A VEHICLE ONBOARD COMPUTER SYSTEM

(71) Applicant: GM GLOBAL TECHNOLOGY OPERATIONS LLC, Detroit, MI (US)

(72) Inventors: Yue Fan, Ann Arbor, MI (US); John C. Lyons, Sterling Heights, MI (US); Fred W. Huntzicker, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 54 days.

(21) Appl. No.: 14/147,750

(22) Filed: Jan. 6, 2014

(65) Prior Publication Data

US 2015/0195052 A1    Jul. 9, 2015

(51) Int. Cl.

| | |
|---|---|
| *H03K 9/00* | (2006.01) |
| *H04L 27/00* | (2006.01) |
| *H04H 60/37* | (2008.01) |
| *H04H 40/00* | (2009.01) |
| *H04H 20/71* | (2008.01) |
| *H04H 60/82* | (2008.01) |
| *B60K 37/00* | (2006.01) |
| *B60K 35/00* | (2006.01) |
| *B60K 37/06* | (2006.01) |

(52) U.S. Cl.
CPC ............... *H04H 60/37* (2013.01); *B60K 35/00* (2013.01); *B60K 37/00* (2013.01); *B60K 37/06* (2013.01); *H04H 20/71* (2013.01); *H04H 40/00* (2013.01); *H04H 60/82* (2013.01); *B60K 2350/10* (2013.01); *B60K 2350/1016* (2013.01); *B60K 2350/1032* (2013.01)

(58) Field of Classification Search
CPC ....... H04H 60/37; H04H 60/82; H04H 40/00; H04H 20/71; G06F 3/04842; H04M 1/72583
See application file for complete search history.

(56) References Cited

U.S. PATENT DOCUMENTS

| | | | |
|---|---|---|---|
| 8,718,797 B1 * | 5/2014 | Addepalli et al. .............. 700/17 |
| 2005/0043880 A1 * | 2/2005 | Yamane et al. ................ 701/200 |
| 2005/0146444 A1 * | 7/2005 | Allen ..................... H04B 1/205 340/4.37 |
| 2005/0227649 A1 * | 10/2005 | Chestnut ............... H03J 1/0075 455/154.1 |
| 2007/0291664 A1 * | 12/2007 | Weyl et al. ..................... 370/254 |
| 2010/0205558 A1 * | 8/2010 | Ng et al. ........................ 715/780 |
| 2010/0280956 A1 * | 11/2010 | Chutorash et al. ............. 705/64 |
| 2014/0164579 A1 * | 6/2014 | Douthitt et al. ............... 709/219 |
| 2014/0277644 A1 * | 9/2014 | Gomes-Casseres .... G06F 17/00 700/94 |
| 2014/0277651 A1 * | 9/2014 | Gomes-Casseres G06F 17/30772 700/94 |
| 2015/0002310 A1 * | 1/2015 | Guo et al. ...................... 340/901 |
| 2015/0029987 A1 * | 1/2015 | Addepalli et al. ............ 370/329 |

\* cited by examiner

*Primary Examiner* — Erin File
(74) *Attorney, Agent, or Firm* — Ingrassia Fisher & Lorenz, P.C.

(57) ABSTRACT

A method for providing display information for preset options using a vehicle onboard computer system is provided. The method replaces a default screen display with a selection screen display for a designated period of time, wherein the selection screen display comprises a plurality of user-selectable preset options; and displays associated broadcast information at each of the plurality of user-selectable preset options.

24 Claims, 5 Drawing Sheets

METHODS AND APPARATUS FOR PROVIDING USER-SELECTABLE PRESET OPTIONS AND ASSOCIATED DATA FOR A VEHICLE ONBOARD COMPUTER SYSTEM

TECHNICAL FIELD

Embodiments of the subject matter described herein relate generally to display data on a vehicle onboard computer system, and more particularly, embodiments of the subject matter relate to displaying data associated with user-selectable preset options on a vehicle onboard computer system.

BACKGROUND

Many vehicles have onboard computer systems offering in-vehicle entertainment and informational capabilities. Such onboard computer systems include a user interface display, from which a user may select options associated with these capabilities, including the capability of receiving broadcasts. More than one broadcast may be presented as a preset button on the user interface display, allowing a user to select a particular, available broadcast. However, a user interface display is limited in the number of preset buttons that are continually displayed and available for selection. In addition, a user may need to select a number of preset buttons associated with broadcasts in sequence to determine the content presented on each selection and to make a decision as to which broadcast he would prefer to select.

Accordingly, it is desirable to present a plurality of preset buttons at once, and to provide broadcast data for each preset button. Furthermore, other desirable features and characteristics will become apparent from the subsequent detailed description and the appended claims, taken in conjunction with the accompanying drawings and the foregoing technical field and background.

BRIEF SUMMARY

A method for providing display information for preset options using a vehicle onboard computer system is provided. The method replaces a default screen display with a selection screen display for a designated period of time, wherein the selection screen display comprises a plurality of user-selectable preset options; and displays associated broadcast information at each of the plurality of user-selectable preset options.

A system for displaying information for preset options using a vehicle onboard computer system is also provided. The system includes a wireless communication module, configured to receive a plurality of broadcasts; a display module, configured to generate: a preset option screen display, comprising a set of preset options and broadcast detail associated with each of the set of preset options; and a default screen display, comprising a subset of the set of preset options and broadcast detail associated with each of the subset; and a user interface, configured to present the default screen display and, when instructed via user input, to present the preset option screen display for a designated period of time.

A non-transitory, computer-readable storage medium containing instructions stored thereon is provided. When executed by a processor, the instructions cause the processor to perform a method for providing broadcast information for preset options. In response to a predefined user input signal, the method presents, for a designated period of time, a display comprising user-selectable preset options and associated data for each respective user-selectable preset option.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods and apparatus used to provide display information for preset options on a vehicle onboard computer system. A user may select a preset option to access a broadcast using the onboard computer system, and the display information provides detail for the associated broadcast. In certain embodiments, a broadcast may include a radio broadcast, streaming media, a podcast, audiobook, or other audio presentation. In some embodiments, the display information may include title, artist, and/or a time-elapsed status.

Figure 1:
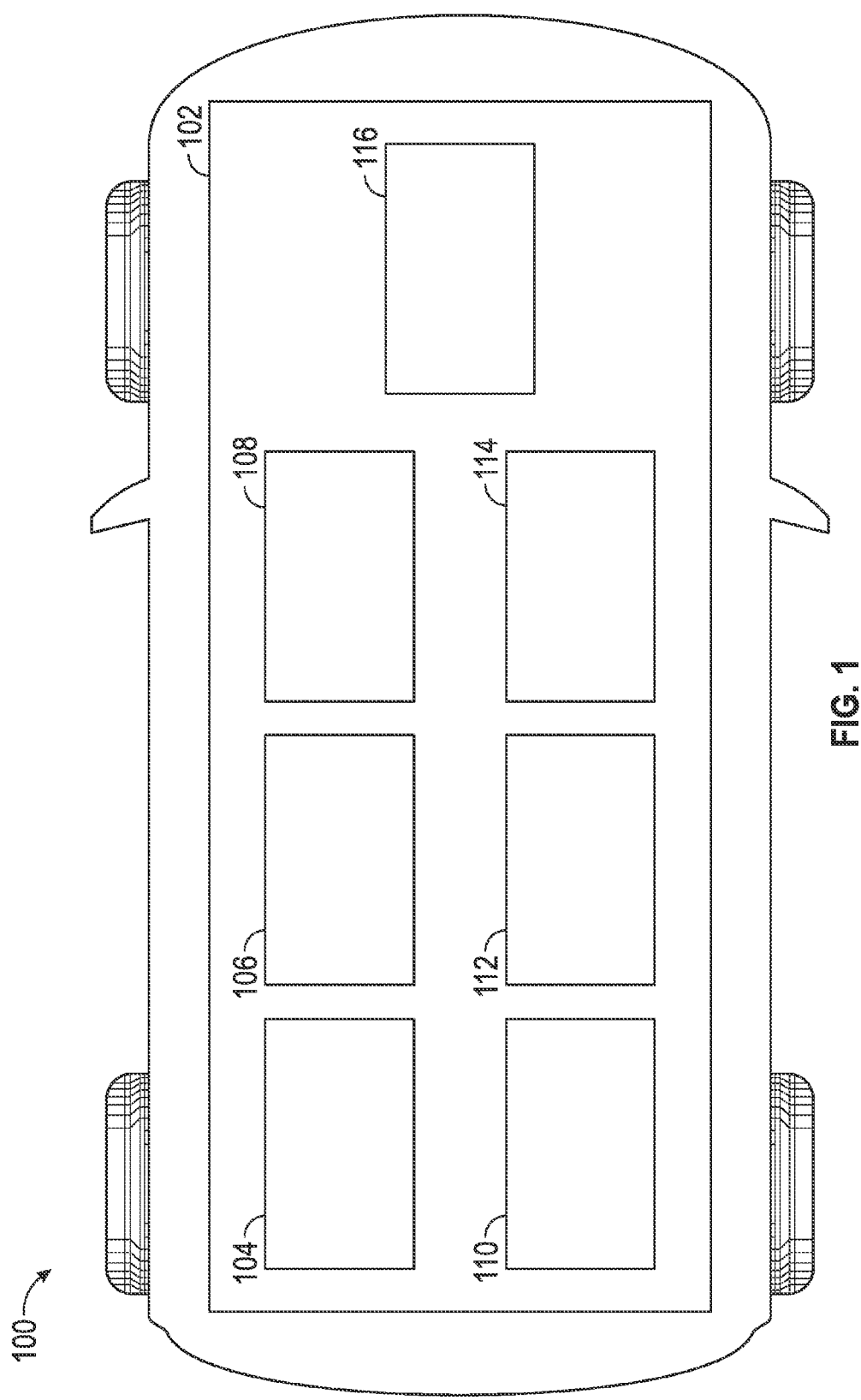
FIG. 1 is a functional block diagram of a vehicle that includes an onboard computer system with the capability of receiving streaming broadcasts, in accordance with an embodiment.

Referring now to the drawings, FIG. 1 is a functional block diagram of a vehicle 100 that includes an onboard computer system 102 with the capability of receiving broadcasts, in accordance with the disclosed embodiments. The vehicle 110 may be any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like.

The onboard computer system 102 is configured to perform various informational and entertainment-oriented tasks, including receiving multiple broadcasts and presenting the received content to a user. The onboard computer system 102 may include, without limitation: a processor architecture 104, a system memory 106, a user interface 108, a wireless communication module 110, a network interface module 112, a preset labeling module 114, and a screen display creation module 116. These elements and features of an onboard computer system 102 may be operatively associated with one another, coupled to one another, or otherwise configured to cooperate with one another as needed to support the desired functionality—in particular, presenting broadcast information for each broadcast at a user-configured preset option of the onboard computer system, as described herein. For ease of illustration and clarity, the various physical, electrical, and logical couplings and interconnections for these elements and features are not depicted in FIG. 1. Moreover, it should be appreciated that embodiments of the onboard computer system 102 will include other elements, modules, and features that cooperate to support the desired functionality. For simplicity, FIG. 1 only depicts certain elements that relate to the display techniques described in more detail below.

The processor architecture 104 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor architecture 104 may be realized as one or more microprocessors, controllers, microcontrollers, or state machines. Moreover, the processor architecture 104 may be implemented as a combination of computing devices, e.g., a combination of digital signal processors and microprocessors, a plurality of microprocessors, one or more microprocessors in conjunction with a digital signal processor core, or any other such configuration.

The system memory 106 may be realized using any number of devices, components, or modules, as appropriate to the embodiment. Moreover, the onboard computer system 102 could include system memory 106 integrated therein and/or system memory 106 operatively coupled thereto, as appropriate to the particular embodiment. In practice, the system memory 106 could be realized as RAM memory, flash memory, EPROM memory, EEPROM memory, registers, a hard disk, a removable disk, or any other form of storage medium known in the art. In certain embodiments, the system memory 106 includes a hard disk, which may also be used to support functions of the onboard computer system 102. The system memory 106 can be coupled to the processor architecture 104 such that the processor architecture 104 can read information from, and write information to, the system memory 106. In the alternative, the system memory 106 may be integral to the processor architecture 104. As an example, the processor architecture 104 and the system memory 106 may reside in a suitably designed application-specific integrated circuit (ASIC).

The user interface 108 may include or cooperate with various features to allow a user to interact with the onboard computer system 102. Accordingly, the user interface 108 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the onboard computer system 102. For example, the user interface 108 could be manipulated by an operator to replace a default screen display with a selection screen display and/or to select a preset option associated with a broadcast.

The wireless communication module 110 is suitably configured to obtain a plurality of broadcasts, for accessibility at the vehicle onboard computer system 102. Received broadcasts may include, without limitation, radio broadcasts, streaming media presentations, audio/video broadcasts, podcasts, audiobook presentations or other audio content, and the like. In certain exemplary embodiments, received broadcasts may include radio broadcasts, such as satellite radio broadcasts, internet radio broadcasts, digital radio frequency broadcasts, analog radio frequency broadcasts, and the like. The wireless communication module 110 is configured to communicate data between the onboard computer system 102 and appropriate hardware to obtain radio frequency broadcasts, including without limitation: analog radio tuners, digital radio tuners, satellite radio tuners, and the like.

The network interface module 112 is suitably configured to communicate data between the onboard computer system 102 and one or more remote servers. In certain embodiments, the network interface module 112 is implemented as an onboard vehicle communication or telematics system, such as an OnStar® module commercially marketed and sold by the OnStar® corporation. In some embodiments, the network interface module 112 is implemented as a consumer electronics device (such as a portable wireless communication device or smartphone) that is located in, or in communication range of, the vehicle onboard computer system 102.

In certain embodiments, an internal transceiver of the network interface module 112 may be capable of providing bi-directional mobile phone voice and data communication, implemented as Code Division Multiple Access (CDMA). In some embodiments, other 3G technologies may be used to implement the network interface module 112, including without limitation: Universal Mobile Telecommunications System (UMTS) wideband CDMA (W-CDMA), Enhanced Data Rates for GSM Evolution (EDGE), Evolved EDGE, High Speed Packet Access (HSPA), CDMA2000, and the like. In some embodiments, 4G technologies may be used to implement the network interface module 112, alone or in combination with 3G technologies, including without limitation: Evolved High Speed Packet Access (HSPA+), Long Term Evolution (LTE) and/or Long Term Evolution-Advanced (LTE-A).

As described in more detail below, data received by the network interface module 112 may include various forms of media (e.g., broadcast data in the form of music, video, podcasts, audio presentations, streaming media, etc.), information associated with available and/or received media, and other data compatible with the onboard computer system 102. Data provided by the network interface module 112 may include requests to access and/or download broadcasts, broadcast information associated with received broadcasts, and the like.

The preset labeling module 114 is configured to obtain broadcast information for each received broadcast received by the wireless communication module 110 or the network interface module 112. The preset labeling module 114 is further configured to associate the obtained broadcast information with an appropriate user-selectable preset option. Each preset option may be programmed by a user to access a specific broadcast network (commonly known as a channel or station). The preset labeling module 114 obtains information associated with current and upcoming broadcasts for applicable channels and associates the channel-specific broadcast information with the appropriate preset option.

In certain embodiments, the preset labeling module 114 extracts the broadcast information from the data stream that includes the broadcast presentation. This extraction technique is usually applied to analog radio frequency broadcasts, digital radio frequency broadcasts, satellite radio broadcasts, and the like. In some embodiments, the preset labeling module 114 accesses a database of broadcast information, typically containing a playlist, presentation duration, current time-elapsed status, and/or other data associated with a specific broadcast network. Generally, the database is accessed at a remote server using the network interface module 112. The preset labeling module 114 communicates with the remote server to obtain the information for broadcasts accessible via the internet, such as an internet radio station. In addition, the preset labeling module 114 may obtain broadcast information from a remote server for any broadcast station/channel having its own website from which the information may be obtained.

In certain embodiments, broadcast information associated with a received broadcast and extracted by the preset labeling module 114 is provided to a remote server via the network interface module 112. At the remote server, the broadcast information is retrievable by other vehicle onboard computer systems for other vehicles, providing an additional source of broadcast information that would otherwise be irretrievable due to the presence of only one radio tuner on each vehicle.

In this case, each received broadcast contains information that is extracted when the broadcast is received at the vehicle onboard computer system 102. A vehicle 100 has one tuner to access broadcasts provided by AM/FM radio. As an example, a car may receive broadcast A using its one tuner, extract the broadcast information for broadcast A, and associate the extracted broadcast information to a preset designated to provide a selection for broadcast A. During this process, the tuner in the vehicle 100 is actively tuned to broadcast A, and does not have the capability of tuning to more than one broadcast at a time. Because of this limitation, the vehicle 100 does not have the capability of extracting broadcast information for more than one broadcast to be displayed at more than one preset.

However, the vehicle 100 does have the capability of uploading the extracted information for broadcast A (via the network interface module 112) to a remote server configured to store broadcast data. Generally, the broadcast information is uploaded along with a location of the vehicle 100 (provided by GPS or other navigation data), and the remote server saves the location data and the broadcast information. In addition, the vehicle 100 has the capability of downloading broadcast information for more than one broadcast using the network interface module 112. Here, the downloaded information may be limited to broadcast information for radio stations in the geographic "listener area" where the vehicle 100 is currently located, thereby only providing relevant information for currently receivable broadcasts.

The screen display creation module 116 is configured to generate screen displays, graphical user interfaces (GUIs), icons, and various graphical elements, for presentation to a user via the user interface 108. Specifically, and within the scope of this application, the screen display creation module 116 generates a default screen display and at least one selection screen display, and the associated graphical elements of each.

Figure 2:
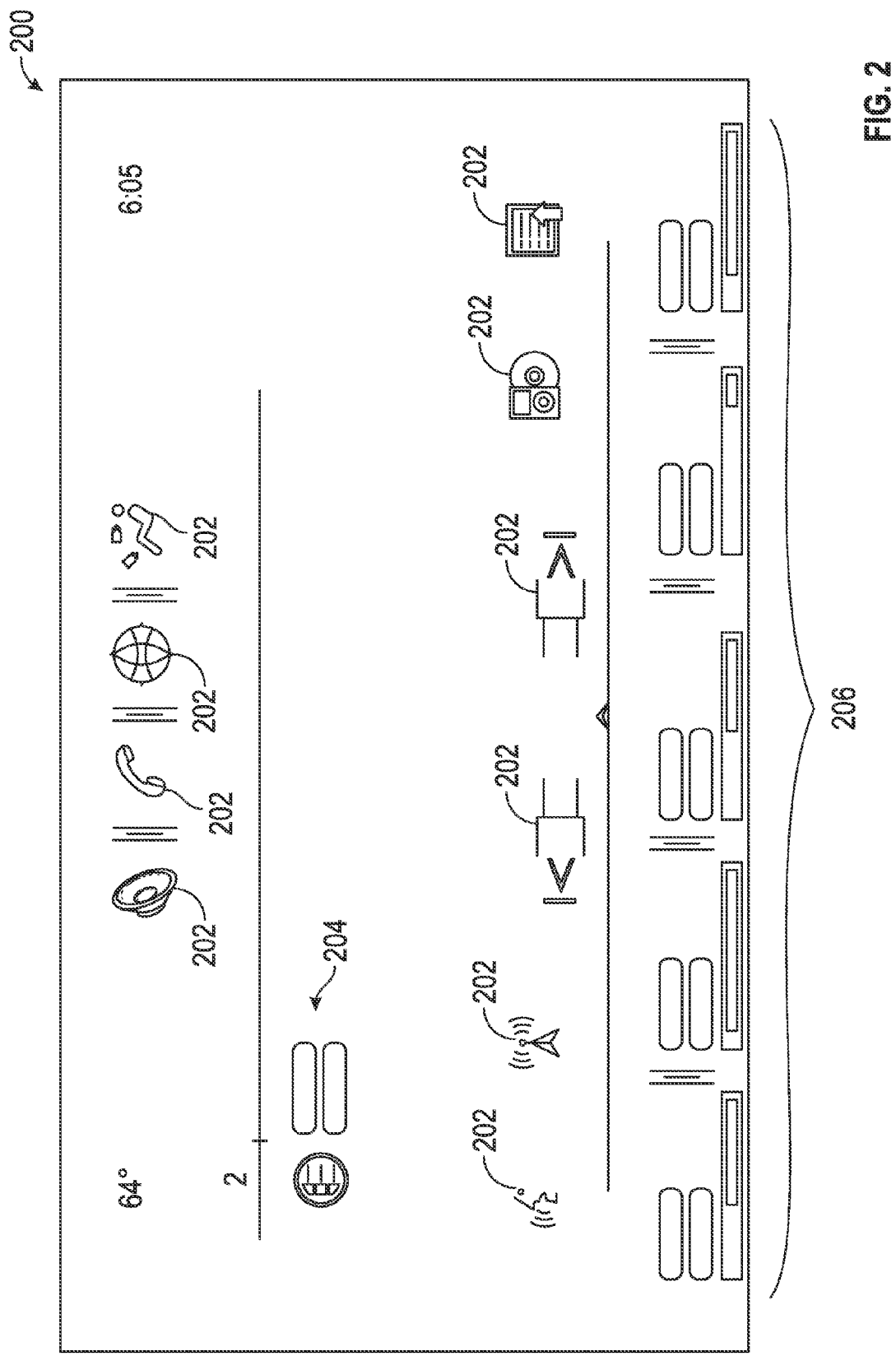
FIG. 2 illustrates a default screen display, in accordance with an embodiment.

Turning now to FIG. 2, a default screen display 200 is illustrated, according to an exemplary embodiment. The default screen display 200 is generally shown upon startup of the vehicle and is returned during periods of time in which a specialized task of the vehicle onboard computer system is not currently being used. As shown, the default screen display 200 includes user-selectable icons 202, providing options for selecting various capabilities of the vehicle onboard computer system 102, indicators of programs in progress and/or idle programs, and graphical indications of entertainment and informational functionality of the vehicle onboard computer system 102. The default screen display 200 presents current broadcast information 204 for a current broadcast on a currently selected station, and further provides a group of user-selectable preset options 206 across the bottom of the default screen display 200. The default screen display 200 is presented on a user interface (shown as reference 108 in FIG. 1), which may include a touchscreen device, in which the icons 202 and user-selectable preset options 206 may be selected when a user touches the screen. Alternatively, the default screen display 200 may be presented as a graphical user interface (GUI) that may be traversed using a pointing device such as a joystick, knob, touchpad, or the like.

Figure 3:
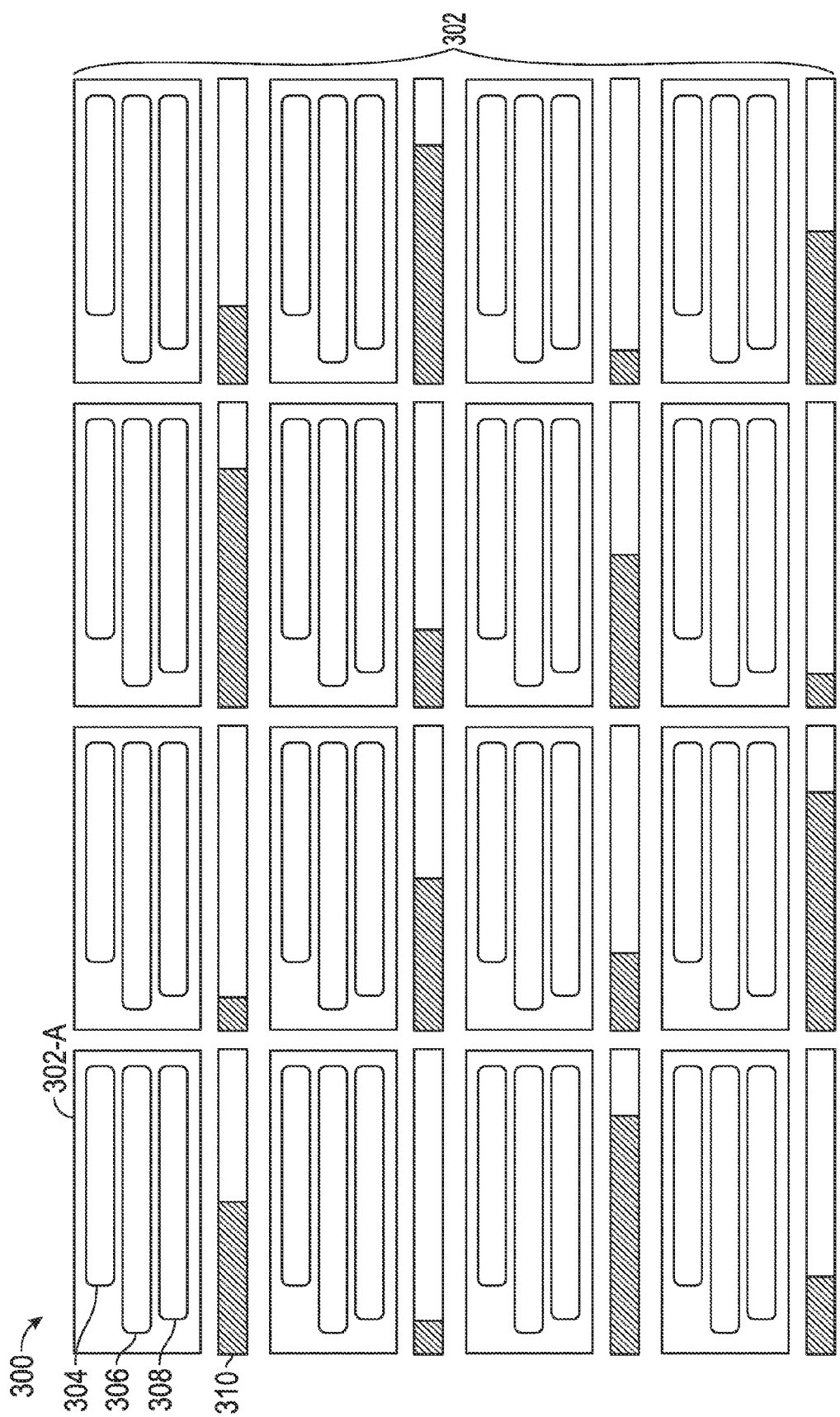
FIG. 3 illustrates a selection screen display, in accordance with an embodiment.

Turning now to FIG. 3, a selection screen display 300 is illustrated, according to an exemplary embodiment. The selection screen display 300 is configured to temporarily appear when the vehicle onboard computer system receives an indication from a user via the user interface. In certain embodiments, the selection screen display 300 replaces a default screen display (discussed previously with regard to FIG. 2) for a designated period of time. In other embodiments, the selection screen display 300 replaces another applicable screen display on the user interface, for a designated period of time. In certain embodiments, the designated period of time is an engineering choice that is programmed into the vehicle onboard computer system at design time; this period of time may last a few seconds or up to a minute. In some embodiments, the designated period of time may be adjustable at the vehicle onboard computer system, according to the preferences of a user. In an exemplary embodiment, the designated period of time lasts until the user makes a selection on the screen.

The indication triggering the appearance of the selection screen display 300 may include, without limitation: selecting the same preset option that is already currently selected, pressing two preset buttons or touchscreen icons simultaneously, making a swiping motion in a designated direction on a touchscreen user-interface, selecting a specific button or touchscreen option, changing the selected broadcast station, or the like.

The selection screen display 300 includes a group of user-selectable preset options 302, to surpass the quantity of preset options presented by the default screen display (discussed previously with regard to FIG. 2). In certain embodiments, the group of user-selectable preset options 302 fills the capacity of the selection screen display 300, which further fills the capacity of the screen of the user interface (shown as reference 108 in FIG. 1). In some embodiments, the selection screen display 300 may be configured to utilize a designated portion of the screen of the user interface, and in some embodiments, the group of user-selectable preset options 302 may be configured to fill a designated portion of the selection screen display 300.

As shown, a user-selectable preset option 302-A on the selection screen display 300 is configured for selection on a touchscreen, and displays broadcast information that is obtained and associated with the preset option 302-A by the preset labeling module (shown as reference 114 in FIG. 1). In certain embodiments, the broadcast information includes a channel/station label 304, current artist and song title information 306, upcoming artist and song title information 308, and/or time-elapsed status information 310 indicating the time that has elapsed in the current streaming broadcast. Each "broadcast" refers to a predefined segment of content, e.g., a song, a radio program, a podcast, an audio/visual program, etc. In certain embodiments, the time-elapsed status information may be displayed as a status bar that fills up as the presentation progresses, a time-value shown as a ratio of time elapsed versus time left, a time-elapsed value, a time-left value, or any other visual representation that can be displayed to depict the passage of time in reference to a whole duration of time.

Although exemplary embodiments of the selection screen display 300 are used in the context of a vehicle onboard computer system (shown as reference 102 in FIG. 1), alternate embodiments may present a selection screen display 300 that replaces a default screen on other devices or software applications ("apps") having the capability of receiving broadcasts, utilizing interactive media, and/or presenting a plurality of user-selectable preset options 302 via a user interface. Examples may include, without limitation: portable electronic devices, such as media players, smartphones, tablet computers, smart-watches, etc.

In certain embodiments, user-selectable preset options may be associated with a function of a vehicle onboard computer system other than receiving broadcasts. In this case, the user-selectable preset options 302 may include stored phone numbers for selection when accessing calling capabilities of an onboard computer system; navigation destinations for selection when accessing navigation capabilities of an onboard computer system; stored media that is not received via broadcast, but rather retrieved from system memory; and the like. A selection screen 300 may incorporate these types of user-selectable preset options 302, alone or in combination with user-selectable preset options 302 associated with available broadcasts.

Figure 4:
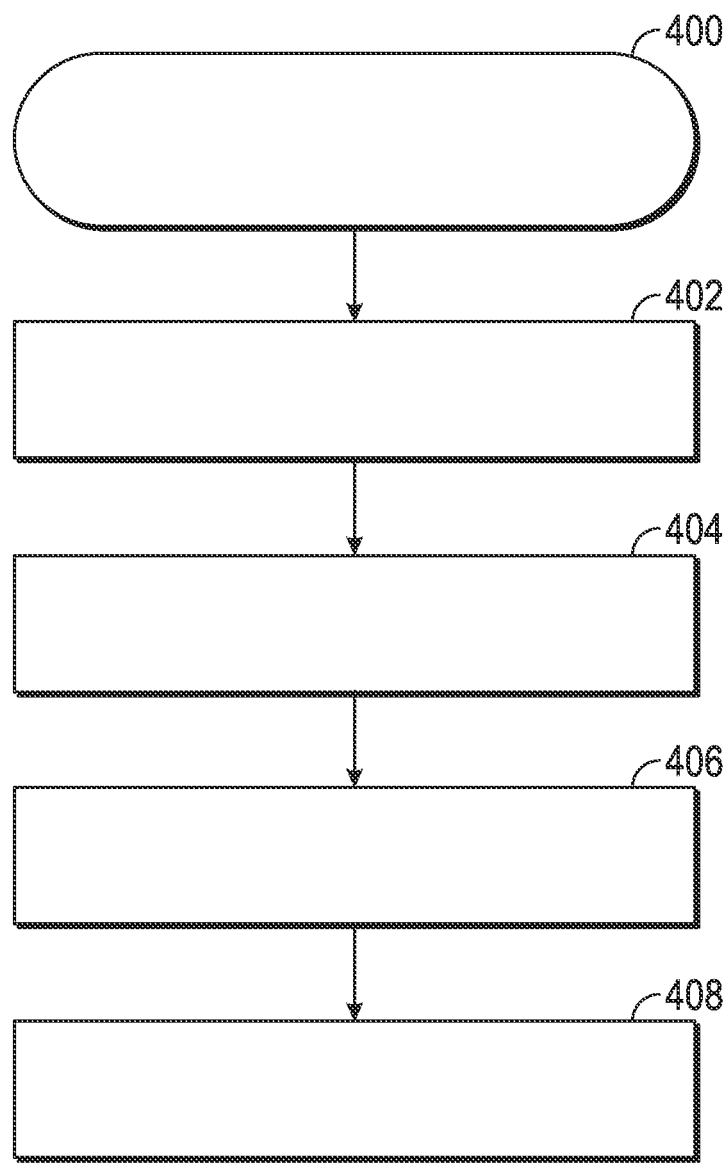
FIG. 4 is a flow chart that illustrates an embodiment of a process for obtaining broadcast information for a user-selectable preset option, in accordance with an embodiment.

FIG. 4 is a flow chart that illustrates an embodiment of a process 400 for obtaining broadcast information for a user-selectable preset option, in accordance with an embodiment. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system, e.g., wireless communication module, the screen display creation module, or the preset labeling module of the vehicle onboard computer system. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

For ease of description and clarity, this example assumes that the process 400 begins when a broadcast is received at a vehicle onboard computer system (step 402). The broadcast may include a radio broadcast, an audio/video presentation, a podcast, an audiobook or other audio presentation, streaming media, or any other streaming or broadcast content which may be received at a vehicle onboard computer system.

Next, the process 400 obtains broadcast information for the broadcast (step 404). Broadcast information may be obtained by extracting data from the broadcast itself, or in other words, the broadcast information may be embedded within the data bitstream that is received at the vehicle onboard computer system, which is configured to recognize and utilize this data. In some embodiments, the broadcast information may be retrieved from a server via wireless communication.

The broadcast information may include current broadcast information and/or broadcast information for the next broadcast in the queue to be streamed after the current broadcast. Broadcast information may further include data for an artist, singer, reader, presenter, or performer of some type of content that is received by the vehicle onboard computer system via broadcast; a title or designation for the broadcast presentation; time-elapsed status information, detailing how much time has passed since the presentation has begun and how much time is left before the presentation is over. In certain embodiments, time-elapsed status information may include time stamps configured to designate occurrences within the broadcast, such as a start timestamp to specify the beginning of the broadcast and an end timestamp to specify the end of the broadcast.

After obtaining the broadcast information for the broadcast (step 404), the process 400 associates the broadcast information with an applicable user-selectable preset option (step 406). The process 400 operates in the background, at the same time that other programs and functions of the onboard computer system are being run, to concurrently obtain broadcast information for a plurality of programmed preset options.

The user-selectable preset options may appear as icons on a touchscreen, as generic hardware buttons below a hardware screen on a vehicle onboard computer system, or the like. The preset options are user-configurable, or in other words, the user is able to program each of the preset options, such that in selecting a preset option, a user may access a desired channel/station which presents content in the form of broadcasts. When a channel/station is configured to be accessed via a user-selectable preset option, broadcast information for each broadcast presented by that channel/station is obtained and associated with that particular preset option. Once the broadcast information is associated with an applicable user-selectable preset option (step 406), the process 400 displays the broadcast information at the associated user-selectable preset option (step 408). Broadcast information is displayed next to each user-selectable preset option on a default screen display and on a selection screen display.

Figure 5:
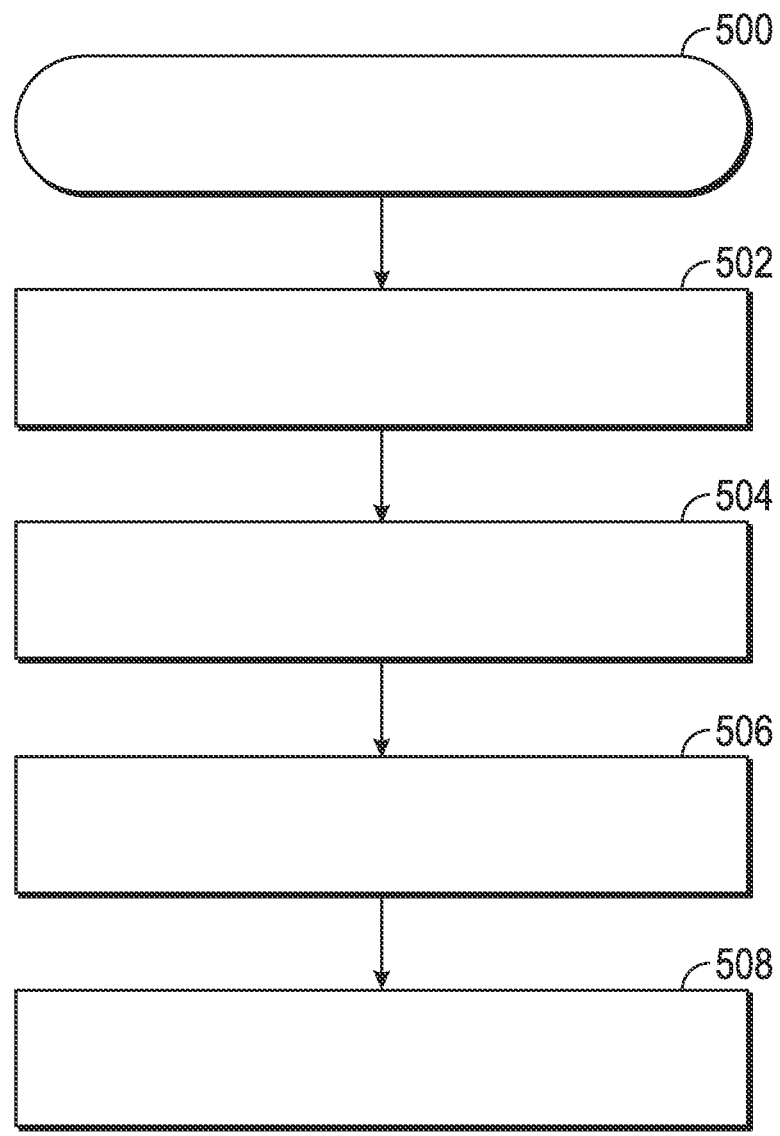
FIG. 5 is a flowchart that illustrates an embodiment of a process for presenting a selection screen display of user-selectable preset options, using a vehicle onboard computer system, in accordance with an embodiment.

FIG. 5 is a flowchart that illustrates an embodiment of a process 500 for presenting a selection screen display of user-selectable preset options, using a vehicle onboard computer system, in accordance with an embodiment. The process 500 begins with the presentation a default screen display on a user interface of a vehicle onboard computer system (step 502). See, for example, the exemplary default screen shown in FIG. 2.

Next, the process 500 receives user input via user interaction with the default screen display (step 504), triggering a change in screen display. A user may interact with the onboard computer system using a specific indication programmed to trigger the selection screen display, such as a button-push or a touchscreen-swipe. Additionally, voice-activated technology or any other means of user interaction may trigger appearance of the selection screen display.

After receiving the user input (step 504), the process 500 presents a selection screen display comprising user-selectable preset options, for a designated period of time (step 506). In certain embodiments, the selection screen display replaces the default screen display. In other embodiments, the selection screen display is presented as a pop-up wherein the default screen display continues to appear in the background, or the selection screen display shares the display-space on the user interface with the default display screen. See, for example, the exemplary screen shown in FIG. 3.

The selection screen display appears for a designated period of time. The selection screen display, once triggered, may appear for a few seconds (or another designated time period), or until another user input signal is received. The selection screen display presents user-selectable preset options, in contrast to the default screen display, which presents a small subset of preset options in combination with other graphical elements associated with a vehicle onboard computer system display.

Finally, the process 500 renders the user-selectable preset options such that they fill the selection screen display (step 508). Like the preset options on the default screen display, the preset options on the selection screen display also include displayed broadcast information for each associated broadcast. Displaying the broadcast information at each preset option presents the user with all of the information necessary to make an informed selection as to which station/channel to select.

A user may program a significant number of preset options to be simultaneously accessible via a selection screen display. This allows a driver to quickly access a significant number of favorite stations and/or channels, rather than devoting extra attention to scrolling in order to access a chosen station or channel, which can be distracting. This large group of these favorite preset options are available with one swipe, selection, button-push, etc., rather than scrolling through presets that are only located across the bottom of the screen. Further, a separate and distinct selection screen display prevents overcrowding of a user's default screen display, which provides basic informational/entertainment functionality for the user. The selection screen display may be set to appear for a few seconds or until a selection is made by the user, or the user may configure the time it will appear and stay on the user interface screen.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing display information for preset options using a vehicle onboard computer system, the method comprising:
   replacing a default screen display with a selection screen display for a designated period of time, wherein the selection screen display comprises a plurality of user-selectable preset options, wherein the selection screen display is configured to fill a capacity of a user interface of the vehicle onboard computer system with the plurality of user-selectable preset options, and wherein the plurality of user-selectable preset options comprises at least one of a radio broadcast, a podcast, or streaming media;
   receiving a data stream associated with one of the plurality of user-selectable preset options, the data stream comprising a broadcast presentation and detail associated with the broadcast presentation;
   extracting the detail from the data stream;
   uploading the detail to a remote server;
   downloading, from the remote server, broadcast information associated with each of a remainder of the plurality of user-selectable preset options;
   displaying the detail at the one of the plurality of user-selectable preset options; and
   displaying the broadcast information at each of the remainder of the plurality of user-selectable preset options.

2. The method of claim 1, wherein the associated broadcast information comprises title information.

3. The method of claim 1, wherein the associated broadcast information comprises time-elapsed status information.

4. The method of claim 1, further comprising:
   rendering the plurality of user-selectable preset options such that the plurality of user-selectable preset options fill the selection screen display.

5. The method of claim 1, further comprising:
   before performing the replacing step, displaying the default screen display with a subset of the plurality of user-selectable preset options; and displaying associated broadcast information at each of the subset of the plurality of user-selectable preset options on the default screen display.

6. The method of claim 5, wherein the subset of the plurality of preset buttons comprises a user-configured number of the plurality of preset buttons.

7. The method of claim 1, further comprising:
receiving a radio broadcast comprising digitally encoded data, wherein the radio broadcast is associated with the one of the plurality of user-selectable preset options, wherein the data stream comprises the radio broadcast;
wherein extracting the detail from the data stream comprises extracting the broadcast information from the digitally encoded data.

8. The method of claim 7, further comprising:
connecting to a server using a wireless local area network (WLAN), wherein the server comprises a database of broadcast information, and wherein the detail comprises the broadcast information; and
uploading, to the server, the extracted broadcast information for the radio broadcast.

9. The method of claim 1, further comprising:
receiving a radio broadcast comprising analog data, wherein the radio broadcast is associated with the one of the plurality of user-selectable preset options, wherein the data stream comprises the radio broadcast;
wherein extracting the detail from the data stream comprises extracting the broadcast information from the analog data.

10. The method of claim 9, further comprising:
connecting to a server using a wireless local area network (WLAN), wherein the server comprises a database of broadcast information, and wherein the detail comprises the broadcast information; and
uploading, to the server, the extracted broadcast information for the radio broadcast.

11. The method of claim 1, further comprising:
connecting to a server using a wireless local area network (WLAN), wherein the server comprises a database of broadcast information, and wherein the detail comprises the broadcast information; and
retrieving, from the server, the associated broadcast information for the one of the plurality of user-selectable preset options.

12. The method of claim 1, further comprising:
receiving a user input via user interaction with the default screen; and
performing the replacing step in response to the received user input.

13. A system for displaying information for preset options using a vehicle onboard computer system, the system comprising:
a wireless communication module, configured to receive a plurality of broadcasts, wherein one of the plurality of broadcasts comprises a broadcast presentation and data associated with the broadcast presentation;
a display module, configured to generate:
a preset option screen display, comprising a set of preset options and broadcast detail associated with each of the set of preset options, wherein the set of preset options comprises at least one of a radio broadcast, a podcast, or streaming media, wherein the preset option screen display is configured to fill a capacity of a user interface of the vehicle onboard computer system, and wherein the one of the plurality of broadcasts is associated with one of the set of preset options; and a default screen display, comprising a subset of the set of preset options and broadcast detail associated with each of the subset, wherein the broadcast detail comprises the data associated with the broadcast presentation;
a user interface, configured to present the default screen display and, when instructed via user input, to present the preset option screen display for a designated period of time; and
a preset labeling module, configured to:
extract the data from the one of the plurality of broadcasts;
upload the data to a remote server;
download, from the remote server, broadcast detail associated with each of a remainder of the set of preset options;
display the data at the one of the set of preset options; and
display the broadcast detail at each of the remainder of the set of preset options.

14. The system of claim 13, wherein the broadcast detail comprises a title for each of the set of preset options.

15. The system of claim 13, wherein the broadcast detail comprises a time-progression status of an associated one of the plurality of broadcasts.

16. The system of claim 13, wherein:
a subset of the plurality of broadcasts comprises analog data received from a plurality of tuners; and
the analog data is received using an onboard vehicle telematics module.

17. A non-transitory, computer-readable storage medium containing instructions stored thereon, wherein, when executed by a processor, the instructions cause the processor to perform a method for providing broadcast information for preset options, the method comprising:
receiving a streaming broadcast comprising digitally encoded data, the streaming broadcast corresponding to a designated user-selectable preset option of a set of user-selectable preset options;
extracting data associated with the streaming broadcast from the digitally encoded data;
uploading the data to a remote server;
downloading, from the remote sever, broadcast information associated with each of a remainder of the set of user-selectable preset options;
in response to a predefined user input signal,
presenting, for a designated period of time, a display comprising the set of user-selectable preset options and associated data for each respective user-selectable preset option, wherein the associated data comprises the data and the broadcast information, wherein the display is configured to fill a capacity of a user interface of a vehicle onboard computer system with the user-selectable preset options, and wherein the user-selectable preset options comprise at least one of a radio broadcast, a podcast, or streaming media.

18. The non-transitory, computer-readable storage medium of claim 17, wherein the associated data comprises:
title data for the streaming broadcast;
time-elapsed data for the streaming broadcast; and
title data for an upcoming second streaming broadcast associated with the designated user-selectable preset option.

19. A method for providing a selection screen display using a vehicle onboard computer system, the method comprising:
replacing a default screen display with a selection screen display for a designated period of time, wherein the selection screen display comprises a plurality of user-selectable preset options, and wherein the plurality of user-selectable preset options comprises one or more radio broadcasts, podcasts, or streaming media; and rendering the plurality of user-selectable preset options such that the plurality of user-selectable preset options fill the selection screen display.

20. The method of claim 19, further comprising:

before performing the replacing step, displaying the default screen display with a subset of the plurality of user-selectable preset options.

21. The method of claim 20, wherein the subset of the plurality of preset buttons comprises a user-configured number of the plurality of preset buttons.

22. The method of claim 19, further comprising:

receiving a user input via user interaction with the default screen; and performing the replacing step in response to the received user input.

23. The method of claim 19, wherein at least one of the user-selectable preset options is associated with a stored phone number for selection when accessing calling capabilities of the vehicle onboard computer system.

24. The method of claim 19, wherein at least one of the user-selectable preset options is associated with a navigation destination for selection when accessing navigation capabilities of the vehicle onboard computer system.

* * * * *